Figure 1:
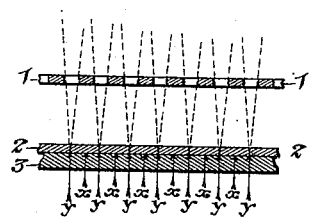

No. 666,423.  
F. E. IVES.  
COLOR PHOTOGRAPHY.  
(Application filed May 16, 1899.)

Patented Jan. 22, 1901.

(No Model.)

Witnesses:-
Louis M. Whitehead.
L. E. Bechtold.

Inventor:-
Frederic E. Ives.
by his Attorneys:-
Howson & Howson

UNITED STATES PATENT OFFICE.

FREDERIC EUGENE IVES, OF PHILADELPHIA, PENNSYLVANIA.

COLOR PHOTOGRAPHY.

SPECIFICATION forming part of Letters Patent No. 666,423, dated January 22, 1901.

Application filed May 16, 1899. Serial No. 717,068. (No specimens.)

*To all whom it may concern:*

Be it known that I, FREDERIC EUGENE IVES, a citizen of the United States, residing in Philadelphia, Pennsylvania, have invented certain Improvements in Color Photography, of which the following is a specification.

This invention relates to that form of "three-color" composite process in which the three images representing the three fundamental color sensations are printed in diffraction-lines, preferably superposed in the same sensitive film, which may be bichromated gelatin or albumen. The three images are separately impressed by printing from the respective negatives or directly in the camera through diffraction-rulings which are differently spaced for the different images, so that in the special viewing device the print representing the red sensation is seen red by light diffracted to the eye from a suitably-situated source and at the same time the other two images, owing to the different spacing of their lines, are seen green and blue, respectively, by light coming from the same source, and as all three diffraction images occupy the same place with outlines and details accurately registered the result optically is a single image in colors. This process is the invention of R. W. Wood. Such composite diffraction-prints when made in bichromated gelatin or albumen may be copied by contact printing on other bichromated films, the copies also acting as positives in the viewing apparatus. Owing to the fact that when these diffraction-line prints are made in bichromated gelatin or albumen the diffraction of the light-rays by which they are made to appear colored is due to wave retardation, variations in the depth of printing cannot be relied upon to produce corresponding variations in the apparent luminosity of the different shades of the photographic image.

The object of my invention is to provide a means of securing the necessary graduation of the luminosity of the diffraction image, so that the lights and shades of the picture appear regularly graduated through all the shades from high light to deepest shadow, as in ordinary photography. This I accomplish by minute interruptions or breaks in the diffraction-lines, which are either microscopic in extent or at most not sufficient to be offensively evident in the shading of the images, and which interruptions or breaks vary in length approximately in accordance with the shading of the photograph or camera image. Such interruptions or breaks in the diffraction-lines are most readily secured by making the exposures through closely-spaced lines ruled in an opaque ground, such lines crossing the much closer and finer diffraction-lines, preferably at right angles thereto. Such a result may be readily obtained with the necessary graduation of the interruptions to represent the shading of the picture by printing with the ruled interrupting-screen at such a distance from the sensitive surface in relation to the area of the source of light employed in making the contact prints or the aperture of the lens in making camera prints that the shadows thrown by the opaque lines are deepest in the center and have a penumbra shading off regularly to the commencement of the penumbra of the next line shadow. Under these conditions the diffraction-lines in the finished print when examined microscopically will appear interrupted and the interruptions more marked in proportion to the holding back of the light by the graduated shades of the positive image. Viewed in the special viewing device the pictures will then appear fully and properly graduated in light and shade like an ordinary photograph, and the accurate reproduction of the graduated shades and compound colors, otherwise difficult if not impossible to secure, is rendered readily practicable.

It is evident that a grained interrupting-screen might be substituted for the ruled-line screen, and that the interruptions might be secured by incorporating semitransparent granules, such as silver bromid, in sufficient coarse grain, either in a film to be placed in contact with the diffraction-ruling or incorporated within or upon the sensitive film itself, and that in the latter case the silver bromid or other semitransparent granules might afterward be dissolved away by a suitable solvent. It is also evident that either of these methods of interrupting the diffraction-lines could be applied equally well in the camera in the production of diffraction images direct from nature.

Figure 2:
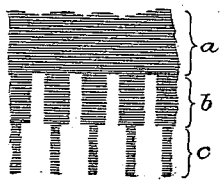
Figure 3:

In the accompanying drawings, Figure 1 is a sectional diagram illustrating the manner of producing a diffraction-line print by the use of a ruled interrupting-screen in accordance with my invention. Fig. 2 is a view representing three different shadings in a print thus produced, and Fig. 3 is a sectional view of a grained screen or film in accordance with my invention. All of the views are much exaggerated.

In Fig. 1 the interrupting-screen is represented at 1, the diffraction-line plate at 2, and the film or plate upon which the print is to be produced at 3, the dotted lines representing the lines of light passing through the transparent or open portions of the interrupting-screen. The points of deepest shadow on the plate 3 will therefore be those represented at $x$, while the points of strongest light will be those represented at $y$, each penumbra gradually shading off from $x$ to $y$.

In the section of a diffraction-line print shown in Fig. 2 the portion where the light has been fully effective is represented by continuous diffraction-lines, as at $a$, a partially-shaded portion being represented by a slight interruption of the diffraction-lines, as at $b$, and a more heavily-shaded portion being represented by a greater interruption of said diffraction-lines, as at $c$.

The screen or film with granular surface, such as before described, is represented in Fig. 3, in which said screen or film is represented at 4 and the surface granules at 5.

I claim—

1. The method of securing graduation of light and shade in diffraction-line photograph-prints, which consists in interrupting the impression of the diffraction-lines by casting linear or granular shadows upon or in the sensitive surface during the operation of impressing the diffraction-line images.

2. Diffraction-line photographic prints in which the graduation of light and shade of the photograph is enhanced by minute interruptions in the diffraction-lines, which interruptions are more marked in proportion to the depth of shade of the photographic image.

In testimony whereof I have signed my name to this specification in the presence of two subscribing witnesses.

FREDERIC EUGENE IVES.

Witnesses:
H. F. REARDON,
FRANK E. BECHTOLD.